(12) United States Patent
Kobayashi et al.

(10) Patent No.: US 7,997,306 B2
(45) Date of Patent: Aug. 16, 2011

(54) INNER STRUCTURE OF FILLER NECK OF FUEL FILLER TUBE

(75) Inventors: Kazuhiro Kobayashi, Saitama (JP); Shinya Murabayashi, Saitama (JP); Yutaka Utsumi, Saitama (JP); Takeshi Ohishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 12/218,190

(22) Filed: Jul. 11, 2008

(65) Prior Publication Data

US 2009/0014091 A1    Jan. 15, 2009

(30) Foreign Application Priority Data

Jul. 13, 2007    (JP) ................................. 2007-184415

(51) Int. Cl.
*B65B 1/04* (2006.01)
(52) U.S. Cl. .......... 141/346; 141/77; 141/286; 141/312; 220/86.2
(58) Field of Classification Search ............ 141/77, 141/286, 312, 346, 363, 350, 59, 331–332, 141/382; 220/86.2
See application file for complete search history.

(56) References Cited

U.S. PATENT DOCUMENTS

| 4,651,889 A * | 3/1987 | Uranishi et al. ............. 220/86.2 |
| 5,860,460 A | 1/1999 | Hidano et al. |
| 6,546,972 B1 * | 4/2003 | Foltz ............................. 141/349 |
| 6,705,481 B2 * | 3/2004 | Temmesfeld ................. 220/86.2 |
| 2005/0005998 A1 * | 1/2005 | Miura et al. ................... 141/382 |

FOREIGN PATENT DOCUMENTS

| DE | 199 48 312 A 1 | 4/2001 |
| EP | 0 943 477 A2 | 9/1999 |
| EP | 1 262 355 A1 | 12/2002 |
| JP | 08-238944 | 9/1996 |
| JP | 2000-142130 | 5/2000 |
| JP | 2003-252069 | 9/2003 |
| JP | 3578421 | 10/2004 |
| JP | 3616516 | 2/2005 |

* cited by examiner

*Primary Examiner* — Gregory L Huson
*Assistant Examiner* — Jason K Niesz
(74) *Attorney, Agent, or Firm* — Carrier Blackman & Associates, P.C.; Joseph P. Carrier; William D. Blackman

(57) ABSTRACT

In an inner structure of a filler neck of a fuel filler tube, a nozzle support section for supporting a nozzle of a fuel filling gun at a gas station includes a pipe member having an inner diameter substantially equal to the outer diameter of the nozzle, and the nozzle is inserted in the pipe member when fueling. Fuel emitted from the nozzle is directed through the pipe member to an outlet end (distal end) of the nozzle support section, at which it starts flowing along an intermediate bent section of the filler tube. Thus, even when the fuel filling gun is not sufficiently inserted in the filler neck, i.e. inserted short of a standard inserted amount, the fuel is allowed to properly jet out in the bent section just as when the fuel filling gun is sufficiently inserted in the filler neck up to the standard inserted amount.

4 Claims, 7 Drawing Sheets

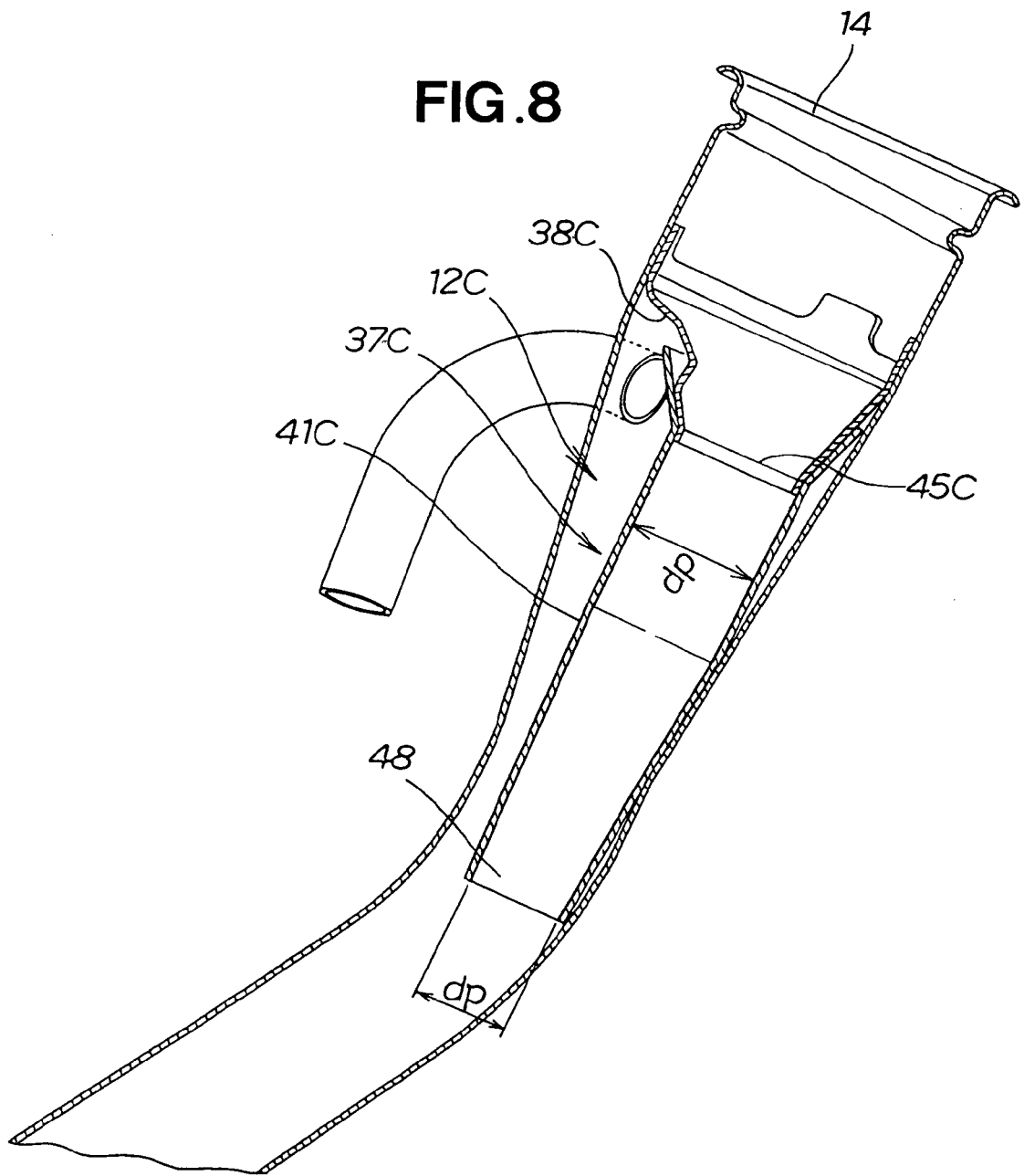

INNER STRUCTURE OF FILLER NECK OF FUEL FILLER TUBE

FIELD OF THE INVENTION

The present invention relates to an improved inner structure of a filler neck of a fuel filler tube in which a fuel filling gun is inserted at a gas station for fueling a vehicle.

BACKGROUND OF THE INVENTION

Generally, automotive vehicles (hereinafter referred to simply as "vehicles") have, in their rear side surface, a filling port for supplying fuel into the vehicle. In some automotive vehicles, a direction regulating member is provided inside the interior of the filling port for regulating a flow direction of the fuel emitted from a fuel filling gun (see, for example, Japanese Patent Publication No. 3,578,421, which will hereinafter be referred to as "Patent Document 1"). Further, in some vehicles, a position regulating structure is provided inside the filling port for regulating an inserted position of the fuel filling gun (see, for example, Japanese Patent Publication No. 3,616,516, which will hereinafter be referred to as "Patent Document 2"). Also known are vehicles where a fuel filler tube is constructed as a dual-tube structure (see, for example, Japanese Patent Application Laid-Open Publication No. 2003-252069, which will hereinafter be referred to as "Patent Document 3".

FIG. 9 hereof illustrates a fuel filler tube structure 201 disclosed in Patent Document 1. The fuel filler tube structure 201 includes a flow direction regulating member 204 of a substantially U cross-sectional shape provided near a filling port 203 of a fuel filler tube 202, and the flow direction regulating member 204 has a flow guide surface slants with respect to the axis line of the fuel filler tube 202 in an upward/downward direction and leftward/rightward direction such that fuel is guided to a fuel tank while swirling spirally along the inner surface of the fuel filler tube 202; thus, undesired scattering of the fuel within the fuel filler tube 202 can be prevented, so that an amount of evaporation of the fuel can be minimized.

However, when a filling nozzle in the filling port 203 is not inserted in the filling port 203 to a sufficient degree, a considerable portion of the fuel emitted from the distal end of the filling nozzle flows down through a free space over the flow direction regulating member 204 without being appropriately guided by the flow direction regulating member 204, and thus, there can be achieved only a weak flow force of the fuel. Particularly, in applications where the filling port 203 needs to be oriented vertically, the flow direction regulating member 204 also extends vertically, and thus, the fuel tends to easily flows down the flow direction regulating member 204 without being appropriately guided by the regulating member 204, so that the flowing speed of the fuel would undesirably decrease.

FIG. 10 is a view of explanatory of a fuel filler tube structure disclosed in Patent Document 2, in which a nozzle-inserted-position regulating structure 231 includes a position regulating member 234 provided on an inner wall surface 233 of a filler tube 232 and having an abutting portion 235. Nozzle 237 of a fuel filling gun 237 abuts against the abutting portion 235, so that the inserted position of the nozzle 237 can be appropriately regulated.

The nozzle-insertion regulating structure 231 can regulate a maximum inserted position of the fuel filling gun 236 as desired, but, even when the fuel filling gun 236 is not inserted to the maximum inserted position, i.e. even when the nozzle 237 is inserted halfway into the filler tube 232, fueling is permitted because a (coil) spring 238 of the nozzle 237 is engaged by a threaded portion 239 of a filler neck of the filler tube 232. The fuel emitted from the insufficiently-inserted nozzle 237 would undesirably jet out scatteringly toward the inner wall surface 233 of the filler tube 232, so that the fuel can not flow through the tube 232 easily and smoothly.

FIG. 11 is a view of explanatory of a fuel filler tube structure 261 disclosed in Patent Document 3. In the fuel filler tube structure 261, a fuel filler tube 263, leading to a fuel tank 262, is constructed as a dual-tube structure including a small-diameter tube 265 substantially equal in diameter to a fuel filling gun 264 and a large-diameter tube 267 surrounding the small-diameter tube 265 with a gap that functions as an overflow path 266 for fuel overflown from the small-diameter tube 265. With such an overflow path 266, the fuel filler tube 261 permits smooth fueling.

However, the fuel filler tube 261 is complicated in construction because the small-diameter tube 265 needs to be provided within the large-diameter tube 267. Particularly, in a case where the fuel filler tube 263 has a great length and many bent portions, the construction of the fuel filler tube structure 261 would become very complicated.

SUMMARY OF THE INVENTION

In view of the foregoing prior art problems, it is an object of the present invention to provide an improved inner structure of a filler neck of a fuel filler tube which permits a stable flow of fuel irrespective of possible variation in inserted amount of the fuel filling gun, and yet can be simplified in construction.

In order to accomplish the above-mentioned object, the present invention provides an improved inner structure of a filler neck of a fuel filler tube for directing fuel from a fuel filling gun to a fuel tank via a filling port of the fuel filler tube, the inner structure comprising: a nozzle support section having a pipe for supporting a nozzle of the fuel filling gun, wherein the pipe has an inner diameter substantially equal to an outer diameter of the nozzle.

Because the pipe constituting the nozzle support section has the inner diameter substantially equal to the outer diameter of the nozzle, the distal end, located remotely from the filling port and orientated toward the fuel tank, of the pipe (nozzle support section) functions similarly to the distal end of the nozzle of the fuel filling gun. Thus, irrespective of possible variation in the inserted amount of the nozzle in the filler neck, the fuel can always start jetting out from the nozzle into the fuel filler tube at the same position, and thus, the fuel flow in the filler tube can be stabilized. Further, because the pipe has the inner diameter substantially equal to the outer diameter of the nozzle, the overall construction of the inner structure of the filler neck can be significantly simplified by forming the pipe, for example, as a straight pipe.

In an embodiment, the pipe 1) has an axial line offset from the axial line of a portion of the fuel filler tube where the pipe is located, 2) forms a relative angle to the axial line of the portion of the fuel filler, or 3) offset from and forms a relative angle to the axial line of the portion of the fuel filler tube, so as to produce a swirling flow, in the fuel filler tube, of the fuel emitted from the nozzle via the pipe. With such an arrangement, the fuel emitted from the pipe can always start its swirling flow at the same position, irrespective of possible variation in the inserted amount of the nozzle in the filler neck.

In an embodiment, the pipe has a reduced inner diameter at its distal end located remote from the filling port, and the reduced inner diameter substantially equals the inner diameter of the nozzle. With the reduced inner diameter substantially equal to the inner diameter of the nozzle, the distal end of the pipe (nozzle support section) functions similarly to the distal end of the nozzle of the fuel filling gun. Thus, irrespective of possible variation in the inserted amount of the nozzle in the filler neck, the fuel can always start jetting out from the nozzle into the fuel filler tube at the same position, and thus, the fuel flow in the filler tube can be stabilized.

In an embodiment, the pipe has a distal end portion remote from the filling port. The distal end portion extends, in a direction toward the fuel tank, to a position within a length range of an intermediate bent section of the fuel filler tube, or to a position beyond the length range of the intermediate bent section. Such an arrangement can prevent undesired scattering of the fuel within the intermediate bent section of the fuel filler tube.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIG. 8 is a perspective view showing a third embodiment of the filler neck structure;

DETAILED DESCRIPTION OF THE PREFERRED EMBODIMENTS

Figure 1:
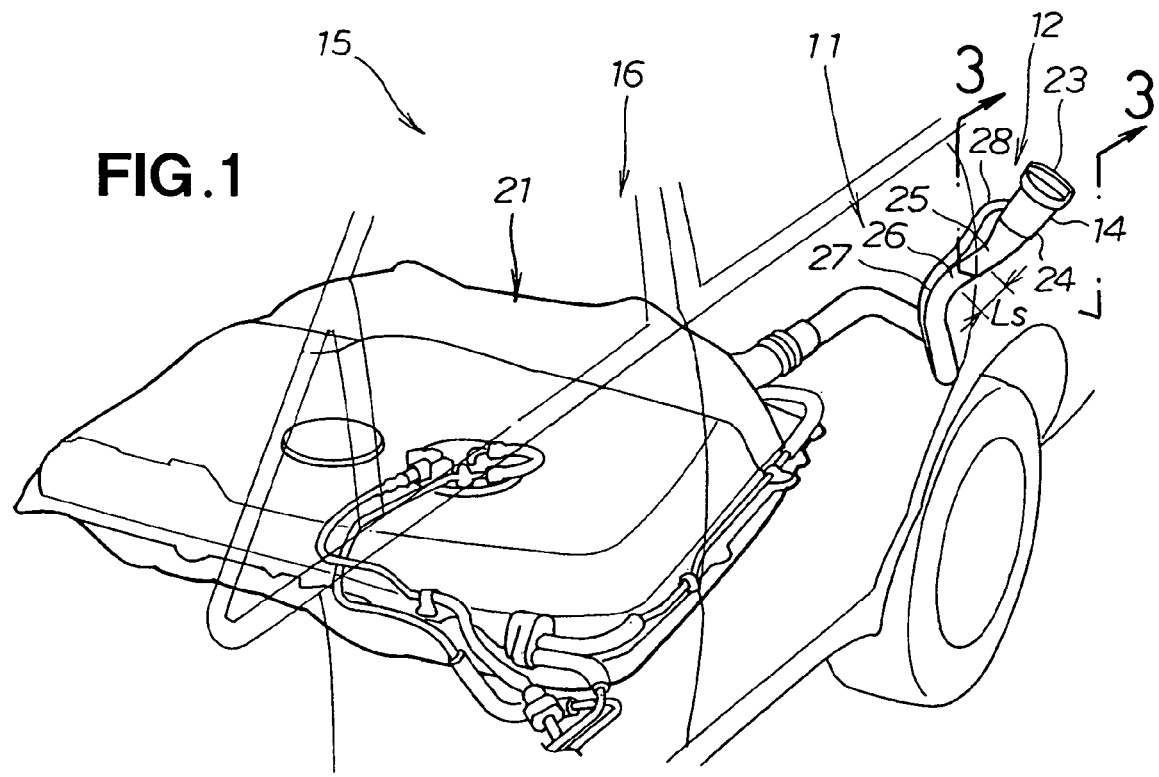
FIG. 1 is a perspective view showing a first embodiment of an inner structure of a filler neck of a fuel filler tube.

Reference is now made to FIG. 1 showing in perspective a first embodiment of an inner structure of a filler neck 12 (hereinafter also referred to as "filler neck structure 12" for convenience of description) in a fuel filler tube provided in a vehicle. The filler neck structure 12 is provided within the fuel filler tube 11 adjacent to the inner or lower end of a filling port 14 of the vehicle in which a fuel filling gun 13 (see FIG. 2) is insertable when fueling, as will be detailed later. The filler neck structure 12 is employed in a fuel storage apparatus 16 of the vehicle 15.

The fuel storage apparatus 16 includes a fuel tank 21 disposed under a rear seat of the vehicle 15, and the fuel filler tube 11 leading to and communicating with the fuel tank 21.

In the fuel filler tube 11, a cap 23 is removably fitted on the filling port 14, and a first tube section 24 is provided in a relatively upright posture and integrally connected with the lower end of the filling port 14. The fuel filler tube 11 also has: a first intermediate bent section 25 integrally formed with the lower end of the first tube section 24 and located near the filling port 14; a straight tube section 26 integrally formed with the lower end of the first intermediate bent section 25; and a second bent section 27 integrally formed with the lower end of the straight tube section 26. Bent pipe 28 is connected to an upper portion of the fuel filler tube 11 adjacent to the filling port 14.

The first intermediate bent section 25 has a small bend radius with a relatively small angle formed between the first tube section 24 and the second intermediate bent section 27, and the first intermediate bent section 25 is a section where the fuel flow is subjected to a relatively great resistance. The first intermediate bent section 25 has a length Le (see FIG. 3), and the straight tube section 26 has a length Ls (see FIG. 3).

Figure 2:
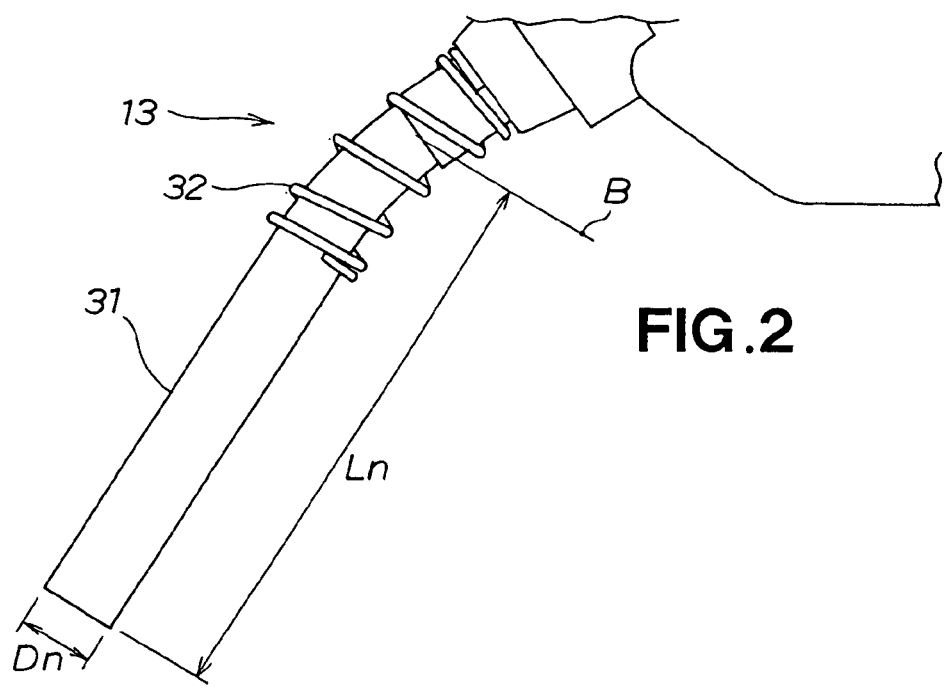
FIG. 2 is a view explanatory of a fuel filling gun for insertion in the filler neck of FIG. 1.

FIG. 2 is a view explanatory of the fuel filling gun 13 for insertion in the filler neck structure 12 in the fuel filler tube 11. The fuel filling gun 13, which is of the conventionally-known construction, includes a nozzle 31 for insertion in the filling port 14 and filler neck 12, and a coil spring 32 wound on the outer periphery of the filling port 14.

The nozzle 31 has an outer diameter Dn and length Ln, and a standard (or yardstick) inserted position thereof is indicated at "B" and substantially conforming to an edge of the filling port 14. The fuel filling gun 13 is held in the port 14 by the spring 32 being locked by the port 14.

Figure 3:
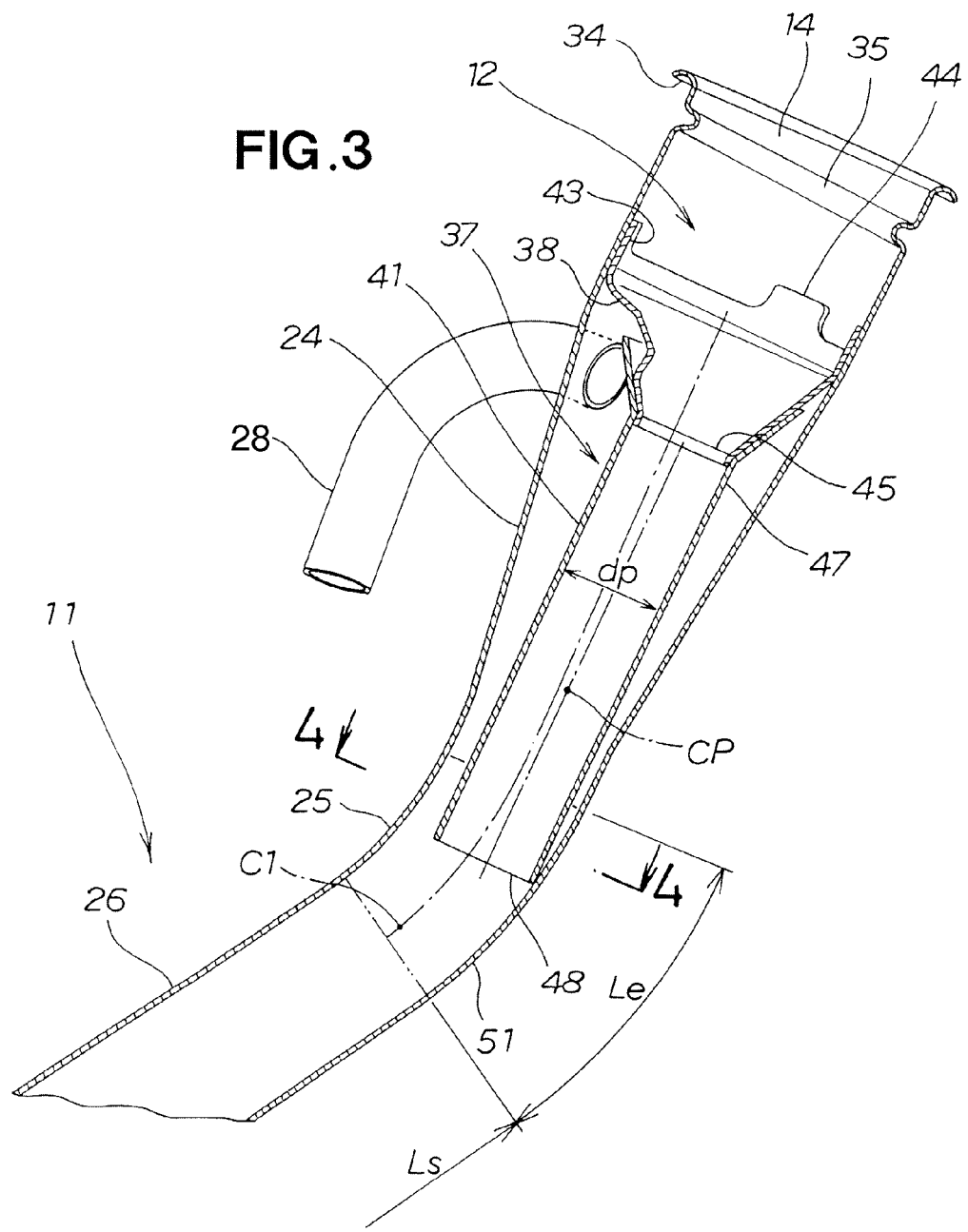
FIG. 3 is a sectional view taken along line 3-3 of FIG. 1.

FIG. 3 is a sectional view taken along the 3-3 line of FIG. 1, which shows respective sections of the filling port 14 and filler neck structure 12 with the cap 23 removed for clarity.

The filling port 14 has a threaded portion 34 onto which the cap 23 is screwed, and which also functions as the upper edge. Locking portion 35 of a reduced diameter is formed integrally with the lower end of the threaded portion 34. The nozzle 31 can be retained in the filler neck structure 12 by the spring 32 being locked by the locking portion 35.

More specifically, the filler neck structure 12 includes a nozzle support portion 37 disposed within the filling port 14. The nozzle support portion 37 includes an upper-end nozzle bracket 38, and a pipe member 41 fixed to the nozzle bracket 38.

The nozzle bracket 38, which has a substantial conical shape, has a fitting end portion 43 fixed to an inner surface portion of the first tube section 24 located a predetermined distance from the filling port 14 inward (or downward), i.e. toward the fuel tank 21. Circular spring-abutting portion 44 is formed on the fitting end portion 43, and a pipe-connecting end portion 45 is formed integrally with the lower end of the fitting end portion 43.

The pipe-connecting end portion 45 has an inner diameter slightly greater than the outer diameter Dn of the nozzle 31 of the fuel filling gun 13, so that a small gap is left between the pipe-connecting end portion 45 and the nozzle 31 when the nozzle 31 is inserted in the filler neck structure 12.

The pipe member 41 is a straight pipe and has a uniform inner diameter dp substantially equal to the outer diameter Dn of the nozzle 31. The pipe member 41 has an inlet end portion 47 fixed to the pipe-connecting end portion 45 of the nozzle bracket 38, and an outlet end (or distal end) portion 48 located remote from the filling port 14, communicating with the inlet end portion 47 and disposed within a range of the length Le of the first intermediate bent section 25 of the fuel filler tube 11; that is, the outlet end (or distal end) portion 48 extends, in a direction toward the fuel tank, to a position within the length range of the first intermediate bent section 25.

For example, the inner diameter dp of the pipe member 41 may be set to satisfy a condition of "dp=Dn+s", where s represents a minute gap in a range of, for example, 1-2 mm. Alternatively, the outlet end (or distal end) portion 48 may be disposed within a range of the length Ls of the straight tube section 26; that is, the outlet end (or distal end) portion 48 may extend, in the direction toward the fuel tank, to a position beyond the length range of the first intermediate bent section 25.

In the instant embodiment, as set forth above, the nozzle support portion 37 comprises the pipe member 41 having the inner diameter dp substantially equal to the outer diameter Dn of the nozzle 31.

Figure 4:
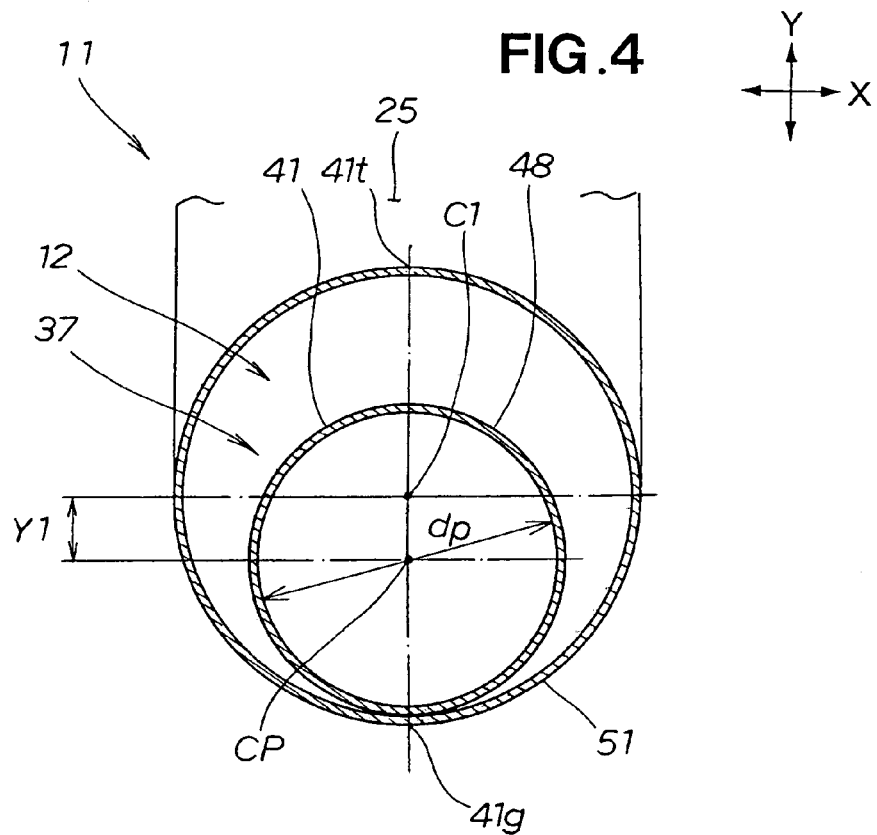
FIG. 4 is a sectional view taken along line 4-4 of FIG. 3.

FIG. 4 is a sectional view taken along the 4-4 line of FIG. 3. As shown, the outlet end (or distal end) portion 48 of the pipe member 41 is offset from an axis line C1 of the fuel filler tube 11 by an amount Y1. More specifically, in the outlet end (or distal end) portion 48, an axis line Cp of the pipe member 41 positionally agrees with the axis line C1 of the fuel filler tube 11 in an X-axis direction, but is offset from the axis line C1 by the amount Y1 in a Y-axis direction. Further, an outer peripheral portion of the outlet end (or distal end) portion 48, facing an outer curved portion 51 of the first intermediate bent section 25, is located adjacent to or in contact with the outer curved portion 51.

In the cross section transverse to the axis line C1 of the fuel filler tube 11, as shown in FIG. 4, the Y axis passes a minimum point (bottom point) 41g where a distance from the ground surface is the smallest and a maximum point (top point) 41t where a distance from the ground surface is the greatest, and the X axis intersects the Y axis at right angles.

Figure 5:
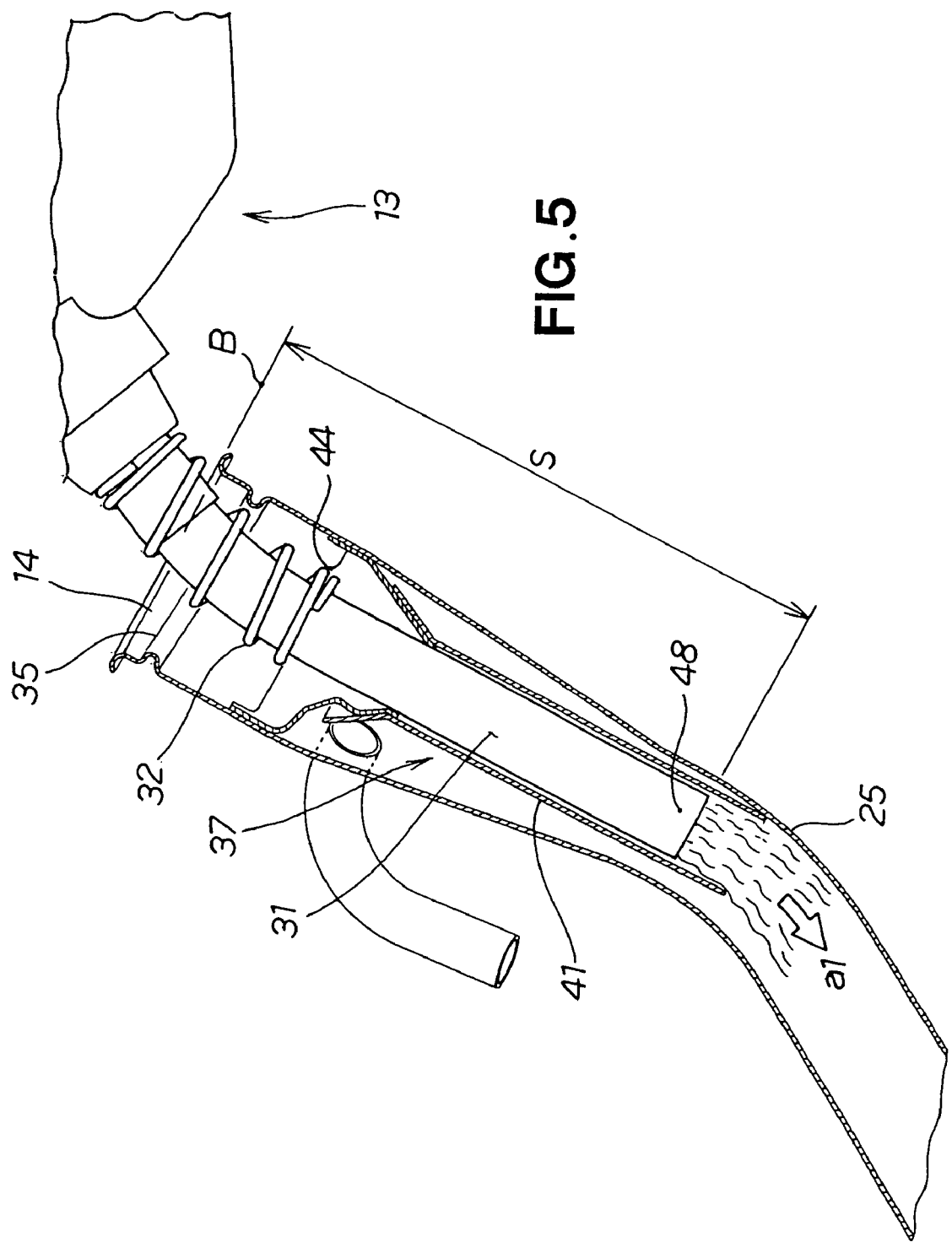
FIG. 5 is a view showing how the filler neck structure directs fuel from the fuel filling gun when the filling gun is in a proper inserted position.

Next, a description will be given about behavior of the first embodiment of the filler neck structure 12. FIG. 5 is a view showing how the first embodiment of the filler neck structure 12 directs the fuel from the fuel filling gun 13 when the filling gun is in a proper inserted position.

As the fuel filling gun 13 of a gas station is inserted in the filling port 14, the nozzle 31 of the fuel filling gun 13 fits into the pipe member 41. The fuel emitted from the nozzle 31 fitted in the pipe member 41 is sent out from the outlet end (or distal end) portion 48 of the pipe member 41, to start flowing along the first intermediate bent section 25 toward the fuel tank, as indicated by arrow a1. Thus, the fuel can be supplied to the fuel tank in an appropriate manner.

More specifically, as the fuel filling gun 13 is inserted through the filling port 14, the nozzle 31 fits into the pipe member 41 with the same inclination as the pipe member 41. Thus, the lower end of the spring 32 wound on the nozzle 31 abuts against the abutting portion 44, so that the standard (or yardstick) inserted position B can substantially agree with the position of the edge of the filling port 14 and the inserted amount of the fuel filling gun 13 in the filler neck can be set at a standard inserted amount S.

Further, because the outlet end (or distal end) portion 48 of the pipe member 41 is located in a substantial middle region of the first intermediate bent section 25, the fuel starts jetting out in the substantial middle region of the first intermediate bent section 25, which can effectively reduce resistance of the fuel flow against the inner surface of the first intermediate bent section 25; as a result, it is effectively prevent scattering of the fuel within the first intermediate bent section 25. Further, the fuel filling gun 13 can be prevented from accidentally falling off the filling port 14, by the spring 32 being locked by the locking portion 35 of the filling port 14.

Figure 6:
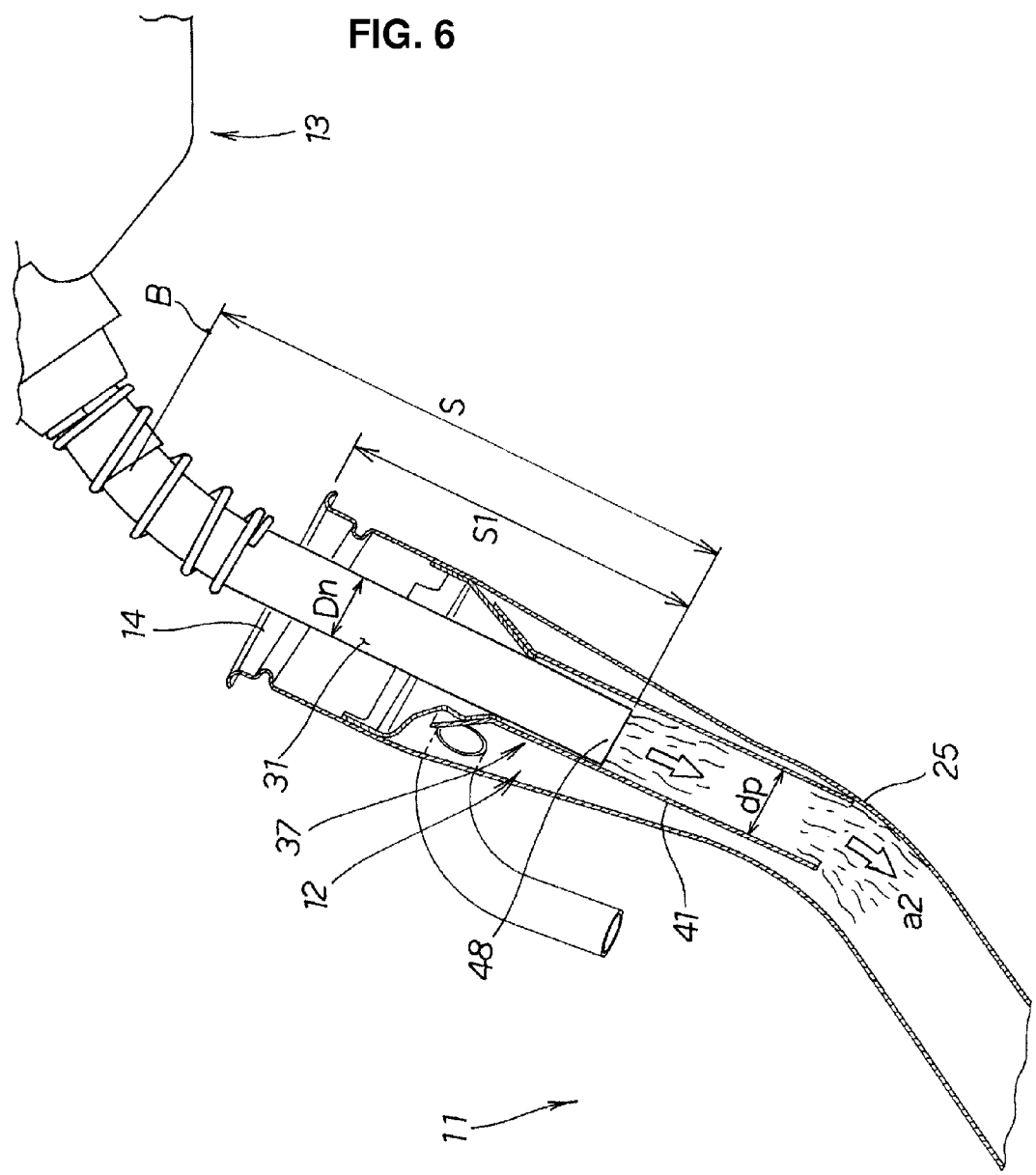
FIG. 6 is a view showing how the filler neck structure directs the fuel from the fuel filling gun when the filling gun is in an insufficiently-inserted position.
Figure 9:
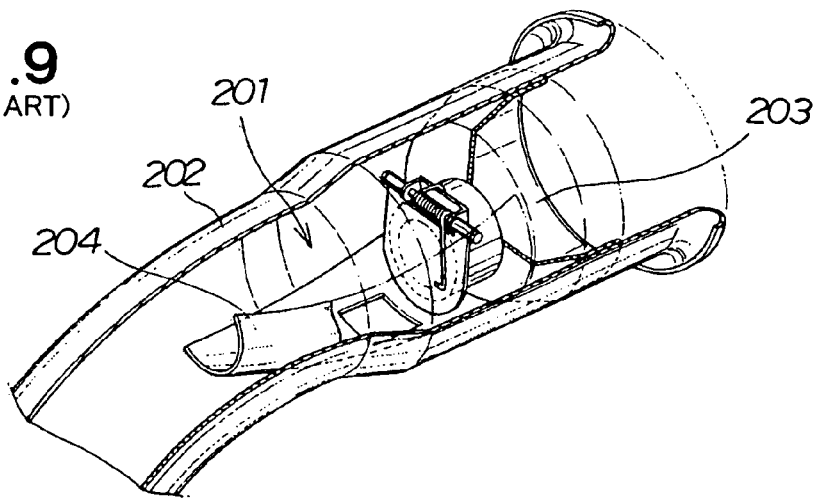
FIG. 9 is a view illustrating a conventionally-known fuel filler tube structure.
Figure 10:
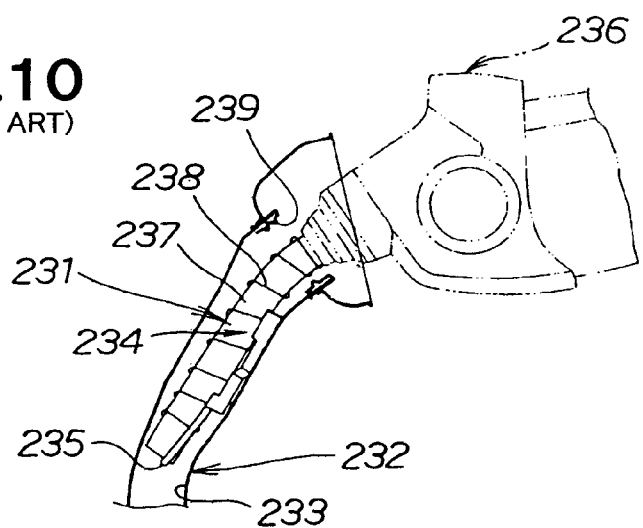
FIG. 10 is a view illustrating another conventionally-known fuel filler tube structure.
Figure 11:
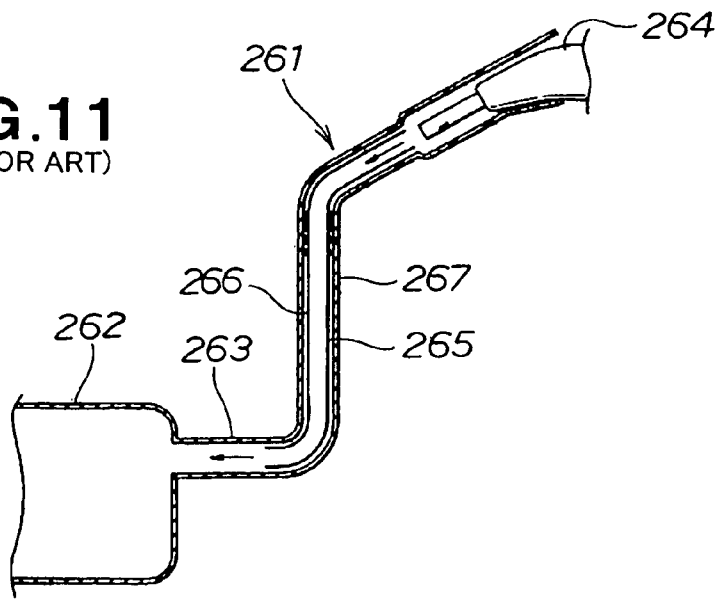
FIG. 11 is a view illustrating still another fuel filler tube structure.

FIG. 6 is a view showing how the first embodiment of the filler neck structure 12 directs the fuel from the fuel filling gun 13 when the filling gun is in an insufficiently-inserted position.

As the fuel filling gun 13 of the gas station is inserted in the filling port 14, the nozzle 31 of the fuel filling gun 13 fits into the pipe member 41, and thus, even when the inserted amount of the fuel filling gun 13 does not reach the standard inserted amount S, the fuel filling gun 13 can be held appropriately by the pipe member 41, and the fueling can be started with the insufficiently-inserted fuel filling gun 13.

Upon start of the fueling, the fuel emitted from the nozzle 31 is directed to the outlet end (or distal end) portion 48 through the pipe member 41, so that it starts flowing along the first intermediate bent section 25 toward the fuel tank, as indicated by arrow a2. Thus, the fuel can be supplied to the fuel tank in an appropriate manner.

Namely, even when the inserted amount of the fuel filling gun 13 does not reach the standard inserted amount S, the fuel starts jetting out in the substantial middle region of the first intermediate bent section 25 just as when the fuel filling gun 13 is inserted to the standard inserted amount S, which can effectively prevent undesired scattering of the fuel within the first intermediate bent section 25.

Namely, in the above-described first embodiment of the filler neck structure 12, the nozzle support portion 37 comprises the pipe member 41 having the inner diameter dp substantially equal to the outer diameter Dn of the nozzle 31, and the pipe member 41 extends at least to a position within the length range of the first intermediate bent section 25. Thus, the first embodiment of the filler neck structure 12 permits a stable flow of the fuel irrespective of possible variation in the inserted amount of the fuel filling gun 13. Further, because the nozzle support portion 37 comprises the pipe member 41 secured to the nozzle bracket 38, the filler neck structure 12 can be significantly simplified in construction.

Figure 7:
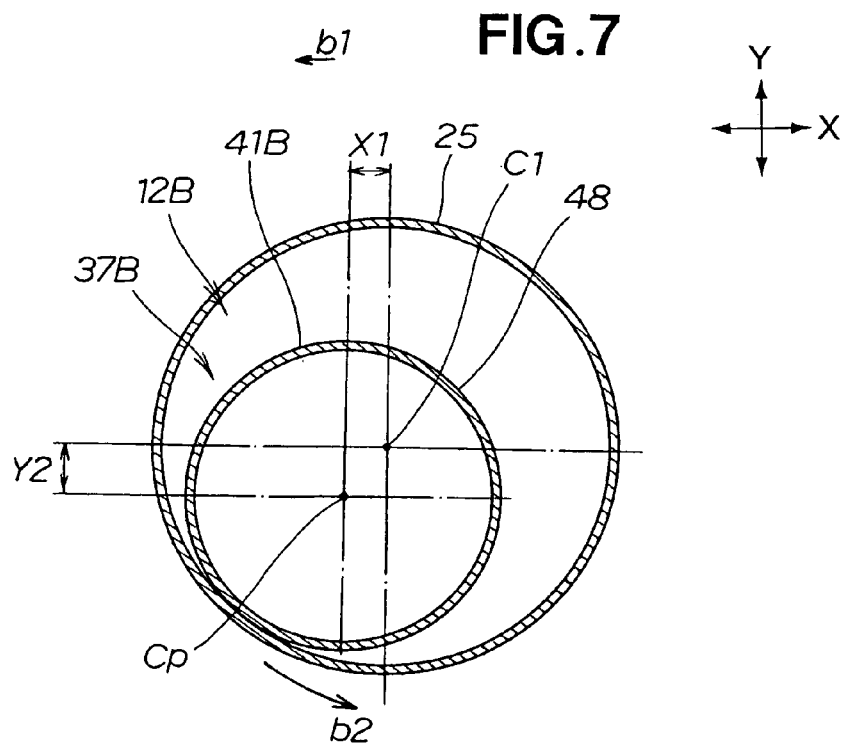
FIG. 7 is a perspective view showing a second embodiment of the filler neck structure.

FIG. 7 is a perspective view showing a second embodiment of the inner structure 12B, which corresponds to FIG. 4. Similar elements to those in the first embodiment are indicated by the same reference numerals and characters as in FIGS. 1-6 and will not be described here to avoid unnecessary duplication.

The second embodiment of the filler neck structure 12B is characterized by including a novel nozzle support portion 37B provided in the filling port 14. The nozzle support portion 37B includes the pipe member 41B. The pipe member 41B has the axis line Cp offset from the axis line C1 of the fuel filler tube 11 by an amount Y2 in the Y-axis direction and by an amount X1 in the X-axis direction (as indicated by arrow b1) so that a swirling flow can be produced in the fuel.

It should be appreciated that the offset directions and offset amounts of the pipe member 41B may be chosen as desired without being limited to the aforementioned.

The second embodiment of the filler neck structure 12B can accomplish substantially the same advantageous benefits as the first embodiment of the inner structure 12.

Further, in the second embodiment of the filler neck structure 12B, the outlet end (or distal end) portion 48 of the pipe member 41, oriented inwardly away from the filling port 14, is offset from the axis line C1 of the fuel filler tube 11 so as to produce a swirling flow of the fuel. Thus, the fuel emitted from the outlet end (or distal end) portion 48 falls down to the bottom of the first intermediate bent section 25, as indicated by arrow b2, to produce a swirling flow. As a consequence, the swirling flow of the fuel can always start at the same position irrespective of possible variation in the inserted amount of the nozzle 31 in the filler neck.

Note that, in the second embodiment of the filler neck structure 12B, the pipe member 41B may be positioned so that the axis line Cp of the pipe member 41B forms a given relative angle to the axis line C1 of the fuel filler tube 11, i.e. the axis line Cp intersects the axis line C1 of the fuel filler tube 11. Further, in the second embodiment, the pipe member 41B may be disposed in such a manner that its axis line Cp is not only offset from the axis line C1 of the fuel filler tube 11 but also forms a relative angle to the axis line C1, i.e. that the axis line Cp vertically extends spirally about the axis line C1 of the fuel filler tube 11. Thus, with these modifications too, the swirling flow of the fuel can always start at the same position irrespective of possible variation in the inserted amount of the nozzle 31 in the filler neck, as with the second embodiment 12B shown in FIG. 7.

FIG. 8 is a perspective view showing a third embodiment of the inner structure 12C, which corresponds to FIG. 3. Similar elements to those in the first embodiment are indicated by the same reference numerals and characters as in FIGS. 1-6 and will not be described here to avoid unnecessary duplication.

The third embodiment of the filler neck structure 12C is characterized by including a novel nozzle support portion 37C provided in the filling port 14. The nozzle support portion 37C includes the nozzle bracket 38C, and the pipe member 41C fixed to the pipe-connecting end portion 45C of the nozzle bracket 38C.

The pipe member 41C, which has a substantial conical shape, has a gradually-decreasing inner diameter dp so that the pipe member 41C has, at the outlet end (or distal end) portion 48, a reduced inner diameter dp substantially equals the inner diameter of the nozzle 31 of the fuel filling gun 13.

The third embodiment of the filler neck structure 12C can accomplish substantially the same advantageous benefits as the first embodiment of the inner structure 12.

Whereas the embodiments of the filler neck structure of the present invention have been described above as employed in a vehicle to be fueled via a fuel filling gun, the basic principles of the of the present invention may be applied to filler necks, through which fluid is supplied, in other equipment than vehicles. Further, in the second and third embodiments, the pipe member 41B and 41C may be offset in the same manner as in the first embodiment, so as to produce a swirling flow of fuel at the same position.

The filler neck structure of the present invention is particularly suited for use in fuel filler tubes connecting to fuel tanks of vehicles.

Obviously, various minor changes and modifications of the present invention are possible in light of the above teaching. It is therefore to be understood that within the scope of the appended claims the invention may be practiced otherwise than as specifically described.

What is claimed is:

1. An inner structure of a filler neck of a fuel filler tube for directing fuel from a fuel filling gun to a fuel tank via a filling port of the fuel filler tube, the inner structure comprising:
    a nozzle support section having a pipe for supporting a nozzle of the fuel filling gun,
    wherein the pipe has an inner diameter substantially equal to an outer diameter of the nozzle,
    wherein the pipe has a distal end portion located remote from the filling port and extending, in a direction toward the fuel tank, to a position within a range of a length of an intermediate bent section of the fuel filler tube,
    wherein the pipe is a straight pipe, and
    wherein the nozzle support section further includes a bracket which is fixed to an inner surface of the fuel filler tube, and the pipe is fixed to the bracket and extends downwardly from the bracket.

2. The filler neck inner structure of claim 1, wherein the bracket is fixed to the inner surface of the fuel filler tube at a position spaced downwardly from an outer opening of the filler tube.

3. The filler neck inner structure of claim 1, wherein the bracket is conical in shape and a lower end of the bracket is fixed within an upper end of the pipe.

4. The filler neck inner structure of claim 1, wherein the lowermost end of the bracket disposed within the upper end of the pipe has a smaller diameter than that of the pipe.

* * * * *